(12) United States Patent
Lindsay

(10) Patent No.: US 6,513,784 B2
(45) Date of Patent: Feb. 4, 2003

(54) VARIABLE FUNCTION DEVICES

(75) Inventor: Richard Arthur Lindsay, Eye (GB)

(73) Assignee: Vitec Group, Plc, Suffolk (GB)

( * ) Notice: Subject to any disclaimer, the term of this patent is extended or adjusted under 35 U.S.C. 154(b) by 0 days.

(21) Appl. No.: 10/023,964

(22) Filed: Dec. 18, 2001

(65) Prior Publication Data

US 2002/0125399 A1 Sep. 12, 2002

(30) Foreign Application Priority Data

Dec. 22, 2000 (GB) .............................................. 0031569

(51) Int. Cl.$^7$ ........................ A47G 29/00; F16M 11/00; F16M 11/04
(52) U.S. Cl. ..................................... 248/694; 248/178.1
(58) Field of Search ........................... 248/177.1, 187.1, 248/178.1, 183.4, 563, 694; 74/567, 577 S, 575, 569, 568 R

(56) References Cited

U.S. PATENT DOCUMENTS

| | | | |
|---|---|---|---|
| 4,447,033 A | * 5/1984 | Jaumann et al. ............. | 248/563 |
| 4,477,033 A | 10/1984 | Kotzur et al. ............. | 242/18 A |
| 5,496,223 A | * 3/1996 | Jarchow ...................... | 475/72 |
| 5,718,152 A | * 2/1998 | Thudium et al. ............. | 74/567 |
| 6,443,032 B1 | * 9/2002 | Fujii et al. .................... | 474/82 |

* cited by examiner

Primary Examiner—Anita King
Assistant Examiner—Amy J. Sterling
(74) Attorney, Agent, or Firm—Moser, Patterson & Sheridan, L.L.P.

(57) ABSTRACT

A system for performing a variable function such as a variable spring resistance comprises a plurality of selectively operable spring devices and movable actuator means for selecting/deselecting devices over a range of movement of the actuator means. The actuator means includes stepped drives for selecting/deselecting at least one of the spring devices at a predetermined ratio with respect to another of the devices whereby spring devices can be selected to operate individually or in combination by movement of the actuator means to provide multiple levels of spring resistance.

10 Claims, 3 Drawing Sheets

VARIABLE FUNCTION DEVICES

BRIEF DESCRIPTION OF THE INVENTION

1. Field of the Invention

This invention relates to variable function devices and particularly although not exclusively to variable counterbalance devices for use in T.V. or video camera pan and tilt heads for controlling tilt movement of the head.

2. Description of the Prior Art

U.S. Pat. No. 4,447,033 (Sachtler GmbH Filmtechniche Gerate) discloses a mechanism or support for a television or movie camera which allows the camera to be tilted or pitched upwardly and downwardly. The weight or torque applied by the camera when tilted from its neutral position is counterbalanced by means of a series of accumulators or spring elements placed between a rotor of the camera support camera and a stator portion of the support. The elements are adapted to be selectively engaged between the rotor and stator depending on the weight of the camera being used. Each accumulator offers a restoring torque that is different from that of the other accumulators such that by selective engagement of various combinations of accumulators, many different weights of cameras can be accommodated.

Individual accumulators are locked with the staters by means of a central operating handle which is rotatably located over the cylindrical stator and has on its inner periphery several cams. These cams serve to press lock pins into recesses of the respective accumulators when the handle is rotated.

By a planned placement of cams on the inner surface of the central operating handle, one or more lock pins can be selectively engaged with their respective individual accumulators by appropriate positioning of the handle. In order to achieve all possible combinations of accumulators it is necessary to be able to re-select accumulators at different positions of the movement of the handle and whilst two or four positions of engagement can be accommodated, difficulties arise in providing eight or more positions which may be necessary to maximise the number of combinations possible from a given set of accumulators.

SUMMARY OF THE INVENTION

This invention provides a system for performing a variable function comprising a plurality of selectively operable devices which provide a required function, actuator means for selecting/deselecting devices over a range of movement of the actuator means, the actuator means including stepped drives for selecting/deselecting at least one of the devices at a predetermined ratio with respect to another of the devices whereby devices can be selected to operate individually or in combination by movement of the actuator means to provide multiple levels of the function.

Preferably the actuator means comprise at least 35 two rotary shafts each having means for selecting/deselecting one or more devices with rotation of the shafts, and drive means coupling the shafts in a predetermined drive ratio whereby the devices are selected singly or in possible combination to provide a range of accumulated functions from the devices.

More specifically the drive ratio between the shafts maybe 2:1.

In one embodiment according to the invention the drive between the shafts may comprise a belt drive extending around wheels of different diameters on the shafts to provide the required drive ratio.

In any of the above arrangements at least one of the actuator drives may have a plurality of devices associated with the drive for selection/deselection.

More specifically drives may select and deselect a plurality of devices.

Further, said stepped drive is preferably arranged to select said devices singly and in all possible combinations through its cycle of movement.

In any of the above arrangements the respective 20 devices may provide progressively increasing functional.

For example the functional effect provided by respective devices may increase in a progression by a factor of two from the lowest function to the highest function.

In one particular application of the invention the function provided by the devices may be a torque resistance to rotation to provide counter-balance in a mechanism for use in a tiltable camera mounting system.

BRIEF DESCRIPTION OF THE DRAWINGS

The following is a description of some specific embodiments of the invention, reference being made to the accompanying drawings in which.

DESCRIPTION OF THE PREFERRED EMBODIMENTS

Figure 1:
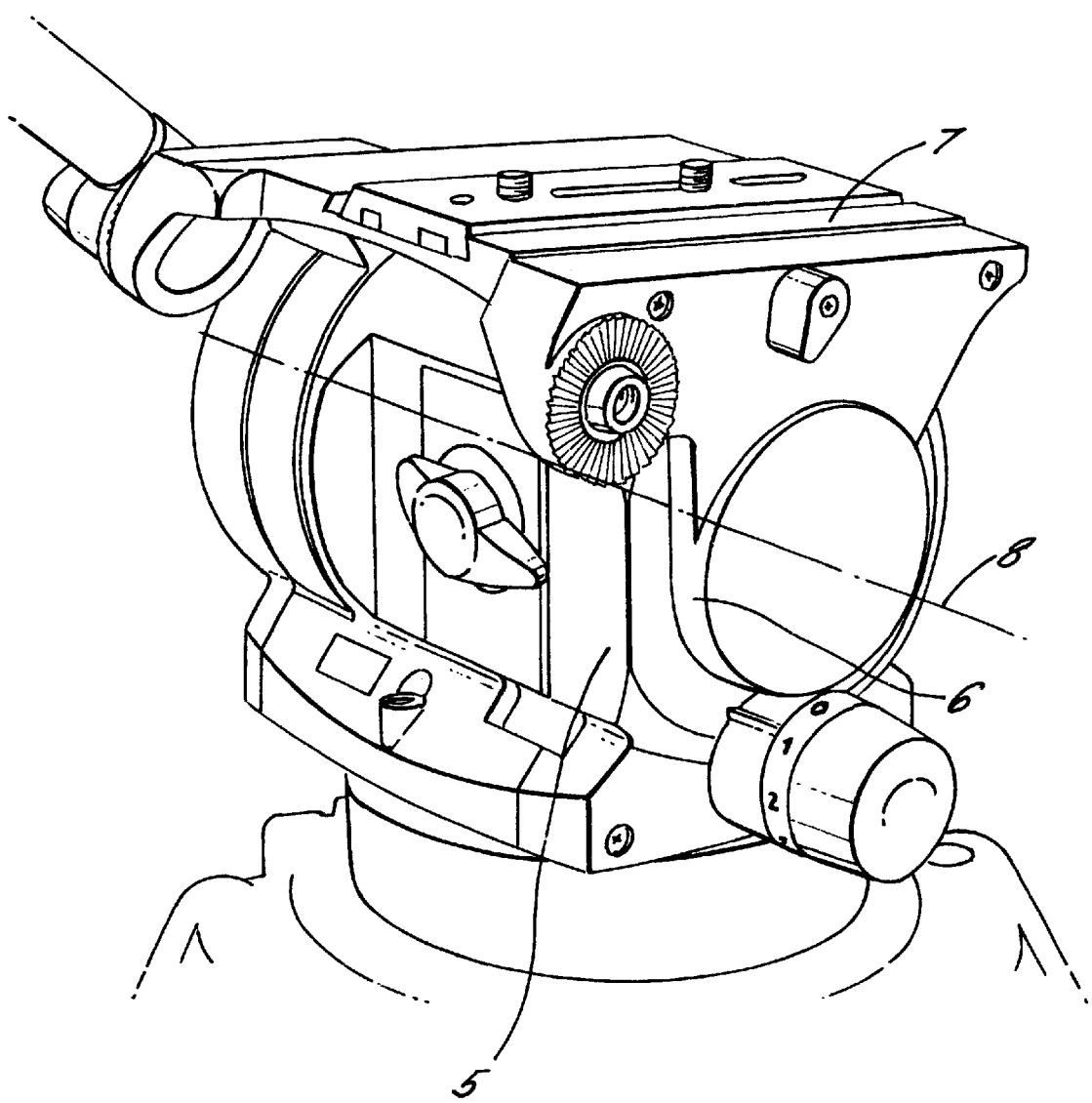
FIG. 1 is a perspective view of a pan and tilt head for mounting a video or T.V. camera.
Figure 2:
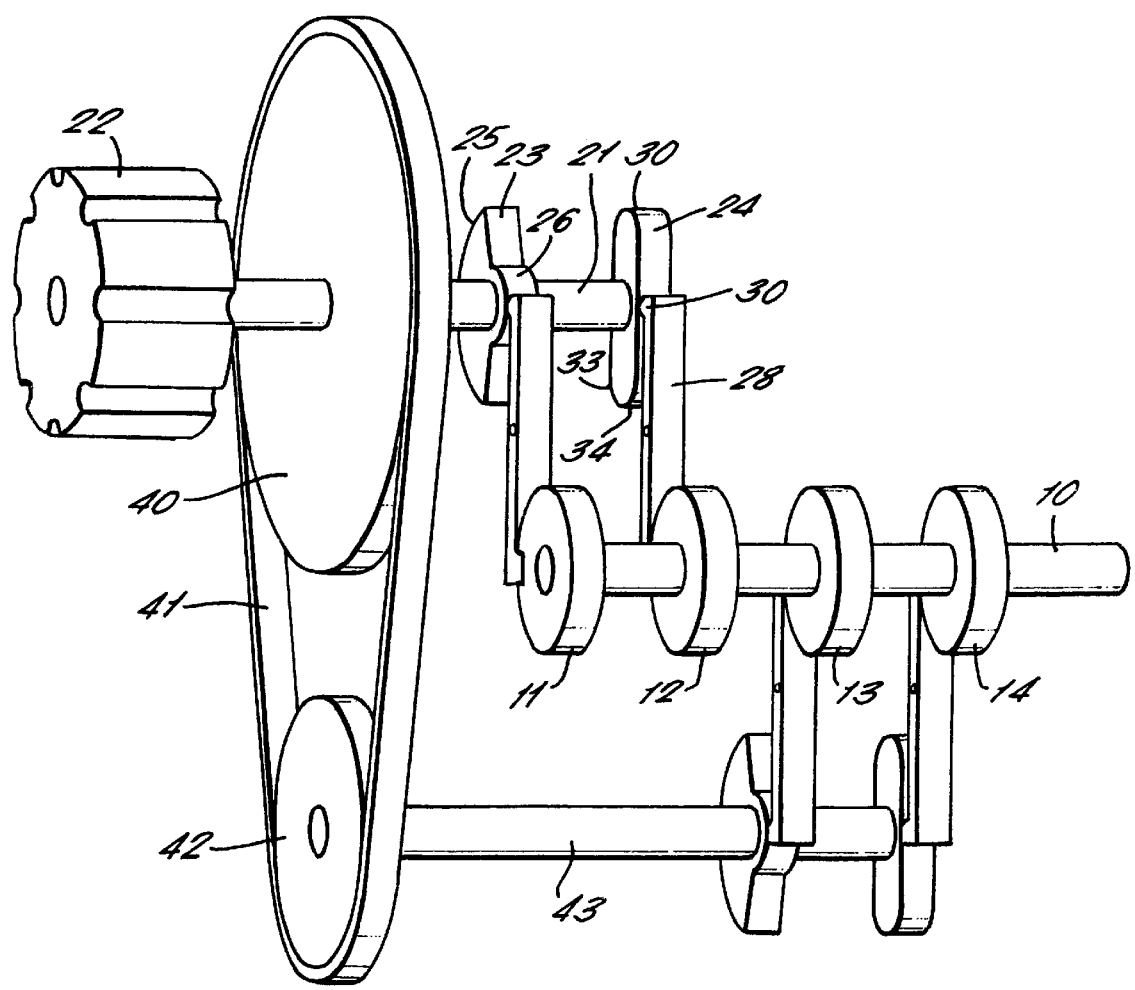
FIG. 2 is a perspective view of part of a counterbalancing mechanism for tilt movement of a TV or video camera including a plurality of rotary resistance devices.
Figure 3:
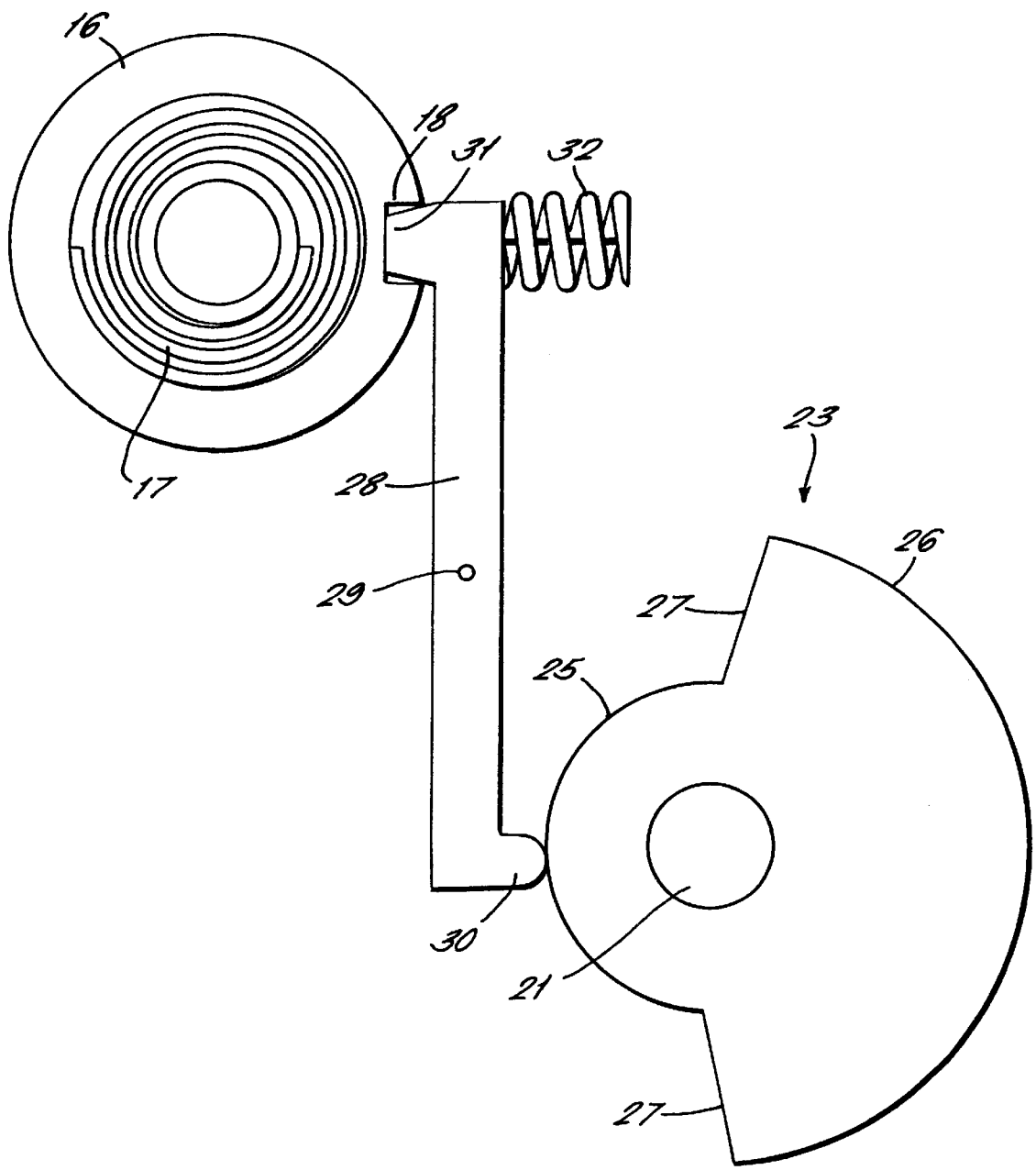
FIG. 3 is a detailed view of one of the rotary resistance devices and a mechanism for rendering the device operative/inoperative.

The arrangement shown in FIGS. 2 and 3 of the drawings is part of a variable resistance counterbalancing mechanism for use in controlling tilt movement of a TV or video camera mounting head as illustrated in FIG. 1. Mountings of the construction in which the counterbalancing mechanism may be incorporated are described and illustrated in our UK Patent Publication Nos 2189043 and 2102757.

A typical TV or video camera mounting head has a fixed stator element 5 and a rotor element 6 and a platform 7 on the rotor element on which the camera is mounted to rotate about a horizontal axis with respect to the stator to provide a range of tilt movement for the camera/mounting about an axis indicated at 8. The mounting has a horizontal or neutral position (as shown) in which the camera is supported with its optical axis extending horizontally and can be tilted to either side of the horizontal to enable the camera to be pointed upwardly or downwardly as required.

The camera is mounted offset from the axis 8 30 about which it tilts on the mounting and a counterbalancing force is required to stabilise the camera and provide "perfect" balance when tilted which will vary according to the particular weight of the camera and the ancilliary equipment such as lenses mounted on the camera.

Referring now to FIG. 2 of the drawings, the rotary element of a tiltable head for a TV or video camera mounting is coupled to a shaft 10 which rotates with the head. The shaft carries four bidirectional rotatable torque resistance devices 11, 12, 13 and 14 of progressively increasing strength preferably increasing by a factor of 2 between each pair of devices. One of the variable resistance devices is illustrated in greater detail in FIG. 3 and comprises an inner ring 15, an outer concentric ring 16 and a loosely wound spiral spring (17) located between the inner and outer rings and attached at its ends to the respective inner and outer rings. The spring provides a resistance to rotation of the inner ring with respect to the outer ring which increases in direct proportion to the rotation of the inner ring in either direction from the neutral position.

As indicated above, the inner ring of each torque resistance device is secured to the shaft 10 and the outer ring is formed with a deep notch 18 to receive a detent for locking the outer ring against rotation when the torque resistance device is required to be operative. The mechanism also comprises a further shaft 21 extending parallel to shaft 10 and having a control knob 22 at one end thereof and two cams 23, 24 secured to the shaft.

The cam 23 is illustrated in greater detail in FIG. 3 to which reference will again be made. The cam has first, smaller diameter section 25 extending a little over 180 degrees around the axis of the shaft 21 and a second, larger diameter section 26 extending over the remaining portion of the cam. The ends of the smaller and larger diameter portions of the cam 25, 26 are joined by radial steps 27. For each cam there is a cam follower 28 pivotally mounted at 29 about an axis parallel to the shaft 21. One end of the cam follower has a rounded nose 30 which bears on the cam and the other end of the cam follower has a projecting stop 31 engageable in a notch 18 in a ring 16. A compression spring 32 acts between the cam follower on the opposite side of the projection 31 and a fixed abutment to bias the cam follower towards the ring 16 of the variable resistance device.

Rotation of the shaft 21 by the knob 22 rotates the cam past the nose 20. When the nose engages the smaller diameter portion 25 of the cam, The stop 31 at the end of the cam is urged by the spring 32 into the notch 18 in the outer ring 16 of the rotary torque resistance device. The outer ring is then locked against movement and rotation of the shaft 10 as the camera is tilted on its mounting will be resisted by the spring of the rotary torque resistance device. When rotation of the shaft 21 by the knob 22 brings the larger diameter portion 26 of the cam into engagement with the nose 30, the cam follower is tilted about the pivotal axis 29 to withdraw the stop 31 from the notch 18 and thereby to release the outer ring 16 of the torque resistance device. The device then ceases to provide any resistance to rotation of the shaft 10. If the shaft 21 is rotated by the knob 22 to move the nose 30 from the larger diameter portion of the cam 26 to the smaller diameter portion 25 the notch 18 on the outer ring 16 of the rotary resistance device may not be in register with the stop 31. By tilting the mounting the stop 31 will ride around the outer surface of the ring 16 until it comes into alignment with and then engagement in the notch. Once engaged the device will provide a torque resistance to further tilting movement of the head.

Shaft 21 carries a further cam 24 acting through a similar cam follower 28 on a second rotary torque resistance device 12 on the shaft 10 similar in construction to the device 11. In this case, the cam 35 is an elongate bar 33 having rounded ends 34 which the nose 30 of the follower engages.

The cam 23 provids one 180° sector 25 over which the stop 31 can engage in the notch 18 and one 180° sector 26 over which the stop 31 is withdrawn from the notch 18. Cam 24 provides engagement of the associated stop 31 with the corresponding notch 18 in a rotary resistance device 12 when the nose 30 is engaged with one or other of the elongate sides of the cam and disengagement of the stop 31 from the notch when the nose is engaged in one or other of the rounded ends 34 of the cam.

Thus, one full rotation of the knob 22 engages the stop for half a turn and disengages the stop for the other half of the turn. On the other hand, cam 24 provides engagement with its associated resistance device twice per turn and disengagement twice per turn. Thus, the cams can be phased to provide engagement of neither rotary resistance device 11 or 12;

engagement of one or other of the rotary resistance devices 11 and 12;

or engagement of both rotary resistance devices 11 and 12 in the course of one 360 degree revolution of the knob 22/shaft 21.

The shaft 21 also carries a sprocket 40 having a belt drive 41 to a second smaller diameter sprocket 42 mounted on a further shaft 43 parallel with shafts 10 and 21. The sprockets are arranged to provide a 2:1 drive between shaft 21 and shaft 43. Shaft 43 carries further cams 23 and 24 similar to cams 23 and 24 on shaft 21 and operating cam followers 28 which engage the further rotary torque resistance devices 13 and 14 on shaft 10.

The 2:1 drive ratio between shafts 21 and 23 couples and decouples the resistance devices 13 and 14 at twice the rate as the resistance devices 11 and 12 with rotation of the knob 22 to provide combinations of neither resistance device 13 and 14, one of the resistance devices 13 and 14 or both resistance devices 13 and 14 with each of the combinations provided by the resistance devices 11 and 12.

The following is a table of the possible 5 combinations provided by the mechanism:

Combination switching

| | | | | | |
|---|---|---|---|---|---|
| Modules | 1 | 2 | 3 | 4 | 5 ... n |
| Magnitude | 1 | 2 | 4 | 8 | 16 ... $2^{n-1}$ |
| No. of combinations (inc zero) | 2 | 4 | 8 | 16 | 32 ... $2^n$ |

| | Modules | | | | |
|---|---|---|---|---|---|
| Magnitude | 1 | 2 | 3 | 4 | 5 |
| 0 | * | * | * | * | * |
| 1 | 1 | * | * | * | * |
| 2 | * | 2 | * | * | * |
| 3 | 1 | 2 | * | * | * |
| 4 | * | * | 4 | * | * |
| 5 | 1 | * | 4 | * | * |
| 6 | * | 2 | 4 | * | * |
| 7 | 1 | 2 | 4 | * | * |
| 8 | * | * | * | 8 | * |
| 9 | 1 | * | * | 8 | * |
| 10 | * | 2 | * | 8 | * |
| 11 | 1 | 2 | * | 8 | * |
| 12 | * | * | 4 | 8 | * |
| 13 | 1 | * | 4 | 8 | * |
| 14 | * | 2 | 4 | 8 | * |
| 15 | 1 | 2 | 4 | 8 | * |
| 16 | * | * | * | * | 16 |
| 17 | 1 | * | * | * | 16 |
| 18 | * | 2 | * | * | 16 |
| 19 | 1 | 2 | * | * | 16 |
| 20 | * | * | 4 | * | 16 |
| 21 | * | * | 4 | * | 16 |
| 22 | * | 2 | 4 | * | 16 |
| 23 | 1 | 2 | 4 | * | 16 |
| 24 | * | * | * | 8 | 16 |
| 25 | 1 | * | * | 8 | 16 |
| 26 | * | 2 | * | 8 | 16 |
| 27 | 1 | 2 | * | 8 | 16 |

-continued

Combination switching

| Modules | 1 | 2 | 3 | 4 | 5 ... n |
|---|---|---|---|---|---|
| Magnitude | 1 | 2 | 4 | 8 | 16 ... $2^{n-1}$ |
| No. of combinations (inc zero) | 2 | 4 | 8 | 16 | 32 ... $2^n$ |

| | Modules | | | | |
|---|---|---|---|---|---|
| Magnitude | 1 | 2 | 3 | 4 | 5 |
| 28 | * | | * | 4 | 8 | 16 |
| 29 | * | | * | 4 | 8 | 16 |
| 30 | * | | 2 | 4 | 8 | 16 |
| 31 | 1 | | 2 | 4 | 8 | 16 |
| Switch Cycles: | 16 | 8 | 4 | 2 | 1 |
| Shaft ratio: | X2 | | X1 | | X1/4 |
| Cycles per rev: | 2 | 1 | 1 | 2 | 1 |

The mechanism generates 16 different levels of resistance (including zero resistance) from the four torque resistance devices to provide a large number of discrete steps of adjustment. Moreover, the mechanism due to its simplicity can be made extremely compact and therefore easy to accommodate in a confirmed space in a camera mounting. The same or a similar mechanism can also be used to operate a switching mechanism for controlling a display showing the current level of resistance provided by the mechanism for the convenience of the operator.

What is claimed is:

1. A system for performing a variable function comprising a plurality of selectively operable devices which provide a required function, actuator means for selecting/deselecting devices over a range of movement of the actuator means, the actuator means including stepped drives for selecting/deselecting at least one of the devices at a predetermined ratio with respect to another of the devices whereby devices can be selected to operate individually or in combination by movement of the actuator means to provide multiple levels of the function.

2. A system as claimed in claim 1, wherein the stepped devices of the actuator means comprise at least two rotary shafts each having means for selecting/deselecting one or more devices with rotation of the shafts, and drive means coupling the shafts in a predetermined drive ratio whereby the devices are selected singly or in possible combination to provide a range of accumulated functions from the devices.

3. A system as claimed in claim 2, wherein the drive ratio between the shafts is 2:1.

4. A system as claimed in claim 2, wherein the drive between the shafts comprises a belt drive extending around wheels of different diameters on the shafts to provide the required drive ratio.

5. A system as claimed in claim 1, wherein at least one of the actuator drives has a plurality of devices associated with the drive for selection/deselection.

6. A system as claimed in claim 5, wherein both drives select and deselect a plurality of devices.

7. A system as claimed in claim 5, wherein said Drives are arranged to select said devices singly and in all possible combinations through its cycle of movement.

8. A system as claimed in claim 1, wherein the respective devices provide progressively increasing functional effect.

9. A system as claimed in claim 8, wherein the functional effect provided by respective devices increases in a progression by a factor of two from the lowest function to the highest function.

10. A system as claimed in claim 9, wherein the function provided by the devices is a torque resistance to rotation to provide counter-balance in a mechanism for use in a tiltable camera mounting system.

* * * * *